April 29, 1969 P. F. M. GLOESS 3,441,722

SYSTEM OF COMMUNICATION BETWEEN MAN AND MACHINE

Filed Sept. 28, 1964

INVENTOR.
Paul Françoise Marie Gloess
By Kemon, Palmer, Stewart & Estabrook
ATTORNEYS.

United States Patent Office 3,441,722
Patented Apr. 29, 1969

3,441,722

SYSTEM OF COMMUNICATION BETWEEN MAN AND MACHINE

Paul François Marie Gloess, Paris, France, assignor to Societe d'Electronique et d'Automatisme, Courbevoie, Hauts-de-Seine, France Filed Sept. 28, 1964, Ser. No. 399,613
Claims priority, application France, Oct. 31, 1963, 952,541
Int. Cl. G06f *3/14;* G06k *15/20*
U.S. Cl. 235—151 10 Claims

ABSTRACT OF THE DISCLOSURE

There is disclosed herein a man-machine communication system wherein a digital computer is operative to produce a graphical display on a light display surface of a light display device. Transducers are arranged in a plane adjacent to the said surface for detecting the display thereon. The transducers are operatively connected to the computer through signal conversion means to supply information thereto, and they are connected through means to the said display device to control raster scanning. In operation, an opaque stylus is employed by the man for drawing purposes on the screen which action results in signals being produced by the transducers which signals are utilized to control the movement of a light spot on the light display surface.

The present invention concerns improvements in or relating to the systems of communications between man and machine of the kind wherein a display and control arrangement is associated to a programme operated computer capable to process coded information data in order that man can deliver fresh data to machine without encoding them and from a direct action on the display supplied to him by machine and machine can inform man of the results of processing of such fresh data by modification of the patterns in said display.

It more particularly concerns improvements to such kinds of systems in which the data stored in the computer are translated in graphs and lines in the pattern of an observation screen for their display, said screen being for instance and in most cases, that of a cathode ray oscilloscope, and in which for modifying and/or introducing fresh data in the computer from said screen, man has recourse to a member modifying the light at localized places on such a pattern. Up to now, for enabling the following of the spot of the line followed by said member, it was necessary that said member incorporate at least one photocell connected to an input of the machine, and further the tracking system from said member, called a light pencil, and enabling the spot to follow the displacement of the said pencil was organized with digital codes. See for instance the following references: (a) "Man-Machine Console Facilities for Computer-Aided Design," published in "Proc.—Spring Joint Computer Conference, 1963," and (b) in the same publication, "Sketch-Pad—A Man-Machine Graphical Communication System."

According to the present invention, and in contradistinction therewith, the tracking arrangement in such a man-machine communication system is characterized in that it comprises an analog servo-loop external to the computer machine with, as a light pick-off arrangement, a set of photocells arranged in a plane slightly spaced from the display screen and parallel thereto with pairs of the said photocells being positioned along the axes of scanning raster on said screen. An opaque light-reflecting pencil may be used by the man for drawing lines and diagrams on the said screen. Follow-up amplifiers are fed with the output voltages of the said set of photocells and controlling with their output voltages deflecting control means for the light spot on said screen. It further comprises analog-to-digital converters fed from the outputs of the said amplifiers where the converters have their outputs connected to digital inputs of the computer. Digital-to-analog converters are fed from outputs of the said computer and have their outputs connected to said deflecting control means; one of the said digital-to-analog converters further controls the light on-off control for said screen.

Figure 1:
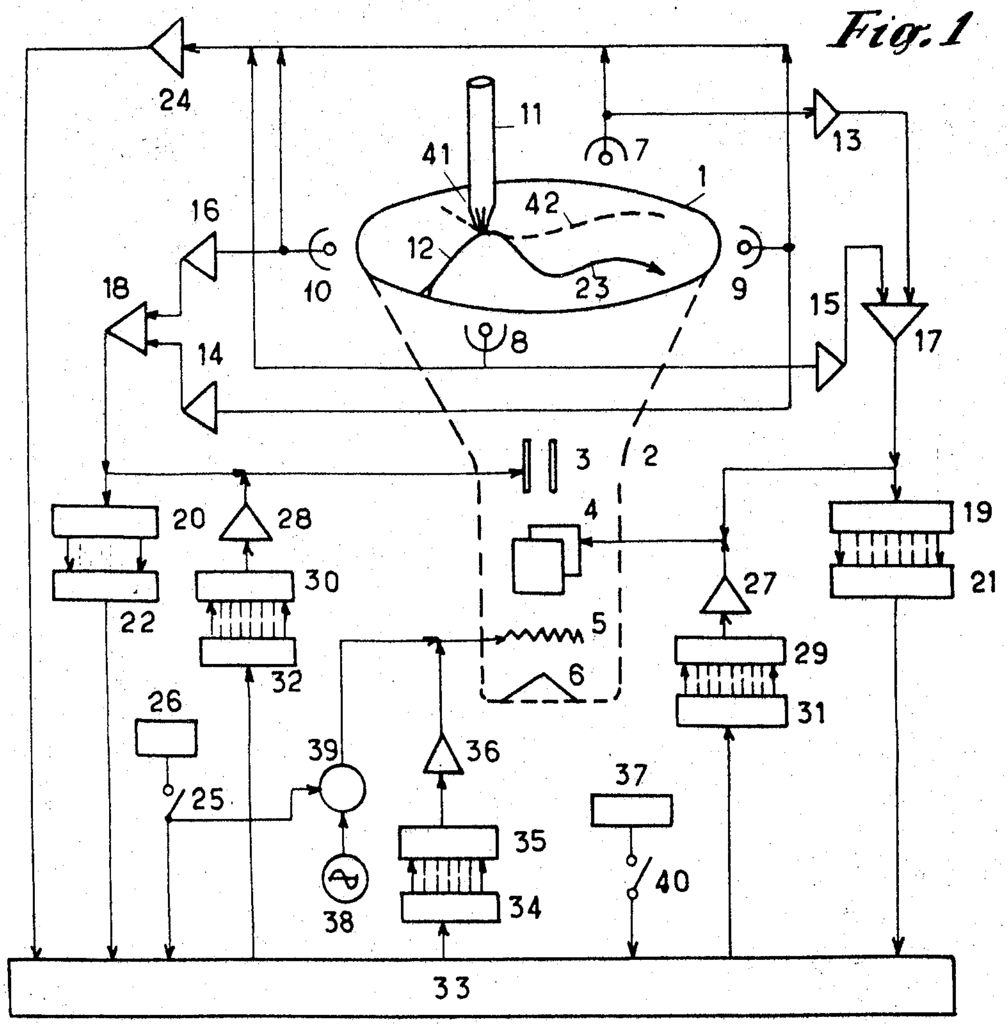
Figure 2:
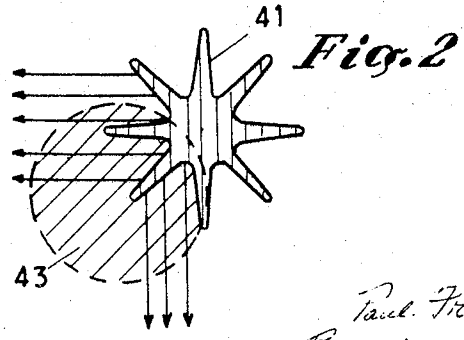

The invention will be described in detail with reference to the accompanying drawings, where FIGURE 1 shows the diagram of example of embodiment thereof, and FIGURE 2 shows a detail of the control pencil over the display screen.

The computer is shown only as a block 33 as it is quite conventional per se, the sole condition being that it consists of a programme operated computer with multiple inputs and outputs in sufficient number. Such computers are well known, for instance see the publication; "A Third Survey of Domestic Electronic Digital Computer Systems," Report No. 1115, published March 1961 by the U.S. Department of Commerce, and see for instance page 843 of the specification of a machine, called R W 400, capable to cooperate with thirty-two input equipments and thirty-two output equipments connectable through a connection adapter for environment organization. Selection can be made of said inputs and outputs by addresses in the instruction programme stored in the machine.

The display screen consists in the embodiment of FIG. 1 of a screen 1 of a cathode-ray oscilloscope 2 comprising two pairs of deflecting plates 3 and 4, an electron-gun 6 and a Wehnelt or other light control electrode 5. The other pieces of the tube, i.e., the accelerator and the anodes are not shown.

For a display, the computer 33 delivers, for a sufficient number of points of a diagram, the digital values of the coordinates X and Y of said points, sequentially in digital registers 31 and 32 provided with decoders 29 and 30 for the digital-to-analog conversion of the contents of said registers. For a number of cases, an on-off control of the electrode 5 may suffice, however, in special cases, and for special effects on the display screen, for instance dotted lines, shades, perspective effects, change of color if the tube is of the color screen television kind, and so forth, a further register 34 is shown receiving selection digital codes from a further output of the computer, and provided with a decoder arrangement 35 for the digital-to-analog conversion. All decoders are followed by buffer amplifiers such as 28, 27 and 36 having their outputs respectively connected to the pairs of deflecting plates 3 and 4 and the control electrode 5. As an example, if each value of X and Y are binary coded with ten bits each, the display system presents the possibility of displaying on the screen 1 a picture with 1,024 dots per line and 1,024 dots per column, consequently 1,048,576 dots per frame. When, for instance, a picture comprises 5,000 points recorded in the machine by their coordinate values in digital codes, it may be restored ten times per second on the screen 1 provided that the electron beam only stays by 20 microseconds on each point (the rate of substitution of the codes in registers 31, 32 and 34 being such that a code is only stored during at most 20 microseconds, including the clearance which may be automatic by using self-erasing registers at a fresh introduction of codes therein for instances). All organizations of registers, decoders and amplifiers are well known by themselves in the computer art.

The equipment for the man essentially comprises means for notifying the machine that he makes an intervention of a given general character (such as an addition, a modification, an erasure in the pattern on the screen) and means for later giving to the machine the particulars of such an intervention. The above first means include at least two manually operable switches 25 and 40. Each of said switches, when closed, delivers to an input of the machine a signal, from the corresponding signal generator 26 or 37, characteristic of the intervention to be made. The signal from 26, through 25, is also applied to a gate 39 the input of which is connected to a high frequency generator 38 and the output of which is connected to the control electrode 5 of the cathode ray tube, in parallel with the output of amplifier 36.

The same first means also comprise, in a plane slightly above the screen 1, two pairs of photocells, 7–8 and 9–10, arranged along relatively orthogonal axes corresponding to the axes of deflection of the plates 3 and 4. The outputs of said photocells are united on the input of an amplifier 24 the output of which is connected to an input of the computer 33. An opaque pencil 11, the cross-section of which is preferably grooved, as shown for instance, in cross-section in FIG. 2 of the drawing, is handled by the man. Only the end 41 of the pencil may be so grooved. When the man applies the tip of the pencil on the screen 1, a modification of the light to the photocells is produced and consequently a modification of the output of amplifier 24; the machine receives a signal informing it that the man is ready to intervene. When the man has closed switch 40, the machine receives a signal informing it that it will be an erasure operation; when, on the other hand, the man has closed the switch the machine receives a signal informing it the operation will be a drawing one.

As the four photocells are also arranged in pairs as said, and are four in number, the grooves of the end 41 of the pencil are preferably higher than four so that the man will not be obliged to orient the pencil with respect to the axes defined by the photocells, and said grooves may advantageously be light reflecting when the pencil tip is near the light spot on the screen at the position selected by the man. Such a light spot is for instance, shown at 43, FIG. 2, on the cross-section of the pencil tip, and it is obvious that it will produce a rupture of equilibrium in the light fluxes directed towards the photocells far more definite than if the grooves had not been provided; actually, with its tip applied on the screen, the pencil will act as a light guide member towards only two of the photocells.

The above-mentioned second means further comprise another amplifier arrangement associated to the photocells in which each photocell is connected to a separate amplifier 13 for photocell 7, 15 for photocell 8, 14 for photocell 9 and 16 for photocell 10. The outputs of 13 and 15 are connected to the inputs of a differential amplifier 17, the output of which is connected to the deflecting plates 4, and the outputs of 14 and 16 are connected to the inputs of a differential amplifier 18 the output of which is connected to the deflecting plates 3. The output from 17 is further connected to the input of an encoder 19, the digits issuing from said encoder (or analog-to-digital converter) are temporarily stored in a digital register 21 the output of which is connected to an input of the computer 33. The output of 18 is similarly further connected to an encoder 20 followed by a digital register 22 the output of which is connected to one input of the computer 33. The contents of the registers 21 and 22 are read-out and then erased on calls from the computer controlled by its stored programme instructions for such read-outs.

The operation of the system for another operation than the first determination of a graph on the screen (made either from data previously stored by the machine or from instructional data from the man) may be explained as follows:

When the man brings the pencil near the screen, the variation of output current from 24 prepares in the computer a modification of processing in that said signal produces an interruption of the display control from the computer by routing the programme of said computer on another subroutine than the maintenance of a display, i.e., on a routine of communication with the man. The screen of the cathode ray tube has nevertheless a sufficient persistence to enable the man to presist to see the pattern of the display he wishes to modify. When such a screen persistency is insufficient, the programme of the machine is adapted to a kind of well-known "time-shearing" operation in order to maintain the previous pattern while the man acts to modify it, and in so doing supply fresh data to the machine.

As soon as the pencil nears the screen, the outputs of the differential amplifiers 17 and 18 are unbalanced and their output voltages directly control, externally from the computer, the displacement of the spot on the screen since said output voltages reach non-null values. Simultaneously, the digital codes of the X and Y coordinates of the pencil tip are formed in the encoders 19 and 20, and temporarily stored in the registers 21 and 22 awaiting a call from the computer. The display control from the computer being cut on the deflecting plates 3 and 4, the spot has come to the center of the screen and then came to the point marked by the pencil tip under the sole control of the deflecting voltages formed at the outputs of 17 and 18.

It may be for instance assumed that the former display showed the curve 12–23 and the man wishes, from the point on said curve on which he places the pencil, to draw the segment of curve 42. He presses the switch 25 and a signal indicates to the computer that it is a fresh curve to be produced and placed in the machine stores. As gate 39 is simultaneously unblocked, a high frequency current modulates the light spot of the tube. Such modulation is for eliminating the stray effect of parasitic ambient light and of the persisting light in the neighborhood of the screen in the response of the photocells. Further, as said, the existence of the grooves in the tip of the pencil, preferably in a number that is a multiple of 4, enhance the assymmetry of distribution of the light on the said photocells, reflecting maximum light to one cell of each pair and minimum light on the other cells of the pairs. The distance from the spot marked by the pencil to the cells varies according its position on the screen and it results in a stray variation of the light which may be attenuated or even eliminated, if required, by a suitably calibrated feedback in the amplifier outputs for modifying their gains as a function of the position of the light spot on the screen. This would further tend to give to the spot an indiffernt equilibrium position on the screen and when the pencil is applied, facilitate the tracking effect of the pencil by the light spot.

The light spot on the screen being then controlled by the position of the pencil, the man has only to follow the line 42 so that the coordinates of the points of said curve will be formed in the registers 21 and 22 and transfered to the computer according to the programme of tracking and acquisition of fresh data or better said, the subroutine to which said programme has been switched within the computer by the action of the signal from 26.

When the man has made the line 42, he takes off the pencil from the screen and this action initiates the return of the computer to the display programme routine. Of course, the switch 25 is or has been reopened. Its condition can be a temporary one at the closure thereof if the gate 39 includes a temporary store reset for instance by the return of the computer to the other subroutine (from an output not shown in the drawing). The change of programme in the computer has been produced by the return to zero of the output of amplifier 24.

Of course, the fresh drawing might be made without any link with the old one on the screen so that, finally, the inscription of a diagram or pattern on the screen when otherwise empty, will be made according to the above described operation.

Assuming now that after he has drawn the line 42, the man decides to erase the branch 23 of the pattern, he closes the switch 40 and the machine will receive an instruction for passing on an erasing subroutine as soon as the part of the display to erase will have been designated to it. The man applies the tip of the pencil on a point of the part of the display to erase or follows said part with the pencil. This latter alternative must be used each time a part to erase has not ben separately entered in the machine stores. The signal from 24 will cause the computer to cease the display programme, so that the coordinates of the part of the display to erase in the machine stores are transmitted to the computer from codes formed in 21 and 22, as in the previous case for the coordinates to add as fresh information in the machine Once the pencil is removed and the switch 40 open, the computer will restore itself to the display programme so that the man can check to see if the erasure has been correctly made.

Similar means could be provided, if wanted, for other operations, for instance a third switch similar to 25 or 40 may be added to the equipment for "conditional" addition of lines or "conditional" erasures: such "conditional" feature denotes the following process, if the man gives an instruction by adding a graph or erasing it, the actual and final result will be a decision of the computer proper which, after entering the instruction and items for modification, will call a subroutine checking if, yes or no, the proposed change is compatible with other data previously stored in the computer; if the decision is negative, a sound or light alarm could be actuated from the computer.

As said the tube may be of a color screen kind. The choice of a color for a graph or part of a graph may be made either by the man (further switches for instance) or by the computer (according instructions to such effect contained in its instruction stores). The same applies when different other representations in black and white (full lines, dot lines, and so forth) are requested.

I claim:

1. A communications system for use with a program operated digital computer, the computer being provided with information inputs and outputs, the communications system comprising:

a light display device having a display surface upon which a changeable pattern of light is displayed, the device including scanning means for controlling scanning of a light spot on said surface such that the spot is positioned with respect to the axes of a coordinate axis system, and the device further including means for controlling the luminosity of said spot;

means for connecting the display device to information outputs of said computer;

manually operable opaque stylus means for drafting on said display surface;

a pair of light responsive electrical transducers for each axis of said coordinate axis system, the transducers of each pair being positioned along their respective axis and all of the said transducers being positioned in spaced relationship to the said display surface so as to receive the light therefrom;

differential amplifier means for each axis of said coordinate axis system individually connecting said pairs of transducers to said spot scanning means such that said spot is moved on said surface in response to applications of said stylue to said surface; and analog-to-digital converter means for each differential amplifier means connected to information inputs of said computer.

2. A system according to claim 1, wherein said opaque stylus means is provided with a light reflecting tip.

3. A system according to claim 2, wherein the tip of said stylus means is provided with longitudinally extending grooves in a number of greater than twice the number of said pairs of transducers.

4. A system according to claim 1, wherein at least some of said transducers are connected together through buffer means to an additional information input of said computer.

5. A system according to claim 1, wherein said luminosity control means is operatively connected to a high frequency generator by a switch.

6. A system according to claim 1, wherein at least one drafting command digital signal generator is operatively connected by a manually operable switch to an information input of said computer.

7. A system according to claim 6 wherein at least two digital signal generators are each separately connectable to information inputs of said computer through normally open manually operable switches, one of said generators being a source of drawing command information and the other generator being a source of erasure command information.

8. A communications system for use with a program operated digital computer, the computer being provided with information inputs and outputs, the communications system comprising:

information display apparatus wherein information is displayed as a pattern of light within a coordinate axis system on a display surface, and where the apparatus includes means for forming a spot of light on said surface and means for scanning said light spot over said surface;

means connected to information outputs of said computer and connected to said apparatus for controlling said spot forming means and said scanning means such that a pattern of light is displayed on said surface;

man operated means for changing the pattern of light displayed on said surface including:

(1) opaque pencil means for drafting a pattern on said surface;

(2) a plurality of light responsive electrical transducers disposed in pairs along the axes of said coordinate system, all of said transducers being positioned in a plane slightly spaced from and substantially parallel to said display surface;

(3) differential amplifiers operatively connected to and supplied from said pairs of transducers, said amplifiers being connected to said scanning means for controlling the scanning of said spot;

(4) analog-to-digital converters connecting said amplifiers to information inputs of said computer, said man operated means being effective to move said spot over said surface and to supply information concerning such movement to information inputs of said computer.

9. A system according to claim 8, wherein said opaque pencil is provided with a tip having longitudinally extending grooves thereon, the number of such grooves being more than twice the number of axes in said coordinate system and where the surfaces of said grooves are light reflecting.

10. A system according to claim 8, wherein said man operated means further includes at least two digital signal generators connectable through manually operable, drawing selection operation switches to separate information inputs of said computer.

References Cited

UNITED STATES PATENTS

| | | | |
|---|---|---|---|
| 2,553,245 | 5/1951 | Espenschied | 178—18 |
| 3,016,421 | 1/1962 | Harmon | 250—222 XR |
| 3,047,723 | 7/1962 | Knapp | 250—222 |
| 3,181,154 | 4/1965 | Henne | 250—217 XR |
| 3,234,512 | 2/1966 | Burkhart | 250—219 XR |

MALCOLM A. MORRISON, *Primary Examiner.*

R. W. WEIG, *Assistant Examiner.*

U.S. Cl. X.R.

250—219